US007277046B2

(12) United States Patent
Adams et al.

(10) Patent No.: US 7,277,046 B2
(45) Date of Patent: Oct. 2, 2007

(54) SINGLE TRANSMIT MULTI-RECEIVER MODULATION RADAR, MULTI-MODULATION RECEIVER AND METHOD

(75) Inventors: Vinh Adams, Tucson, AZ (US); Wesley Dwelly, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 253 days.

(21) Appl. No.: 11/177,712

(22) Filed: Jul. 8, 2005

(65) Prior Publication Data

US 2007/0018884 A1    Jan. 25, 2007

(51) Int. Cl.
*G01S 13/06* (2006.01)
(52) U.S. Cl. .................. 342/147; 342/189; 342/126; 342/133; 342/139; 342/417; 342/444; 342/463
(58) Field of Classification Search ................. 342/147, 342/189, 126, 133, 139, 140, 146, 56, 417–419, 342/443, 444, 450, 463–465
See application file for complete search history.

(56) References Cited

U.S. PATENT DOCUMENTS

| 5,347,285 | A | * | 9/1994 | MacDoran et al. | .... 342/357.12 |
| 5,365,516 | A | * | 11/1994 | Jandrell | ....................... 370/335 |
| 5,526,357 | A | * | 6/1996 | Jandrell | ....................... 370/346 |
| 5,757,916 | A | * | 5/1998 | MacDoran et al. | ......... 380/258 |
| 7,151,478 | B1 | * | 12/2006 | Adams et al. | ................. 342/62 |
| 2006/0067451 | A1 | * | 3/2006 | Pollman et al. | ............. 375/367 |
| 2007/0008213 | A1 | * | 1/2007 | Adams et al. | .............. 342/159 |
| 2007/0018884 | A1 | * | 1/2007 | Adams et al. | .............. 342/147 |

* cited by examiner

*Primary Examiner*—John B Sotomayor
(74) *Attorney, Agent, or Firm*—Schwegman, Lundberg, Woessner & Kluth, P.A.; Gregory J. Gorrie

(57) ABSTRACT

A single transmit multi-receiver modulation radar modulates radar return signals received through an associated receive-signal path with one of a plurality of differing modulation waveforms having low-cross correlation products. Each receive-signal path may be associated with a different receive direction. The differently modulated return signals from each receive-signal path may be combined and correlations may be performed on the combined and differently modulated radar return signals using the modulation waveforms to locate a target. In some embodiments, the trajectory of the target may be extrapolated and the target's source location may be determined.

40 Claims, 10 Drawing Sheets

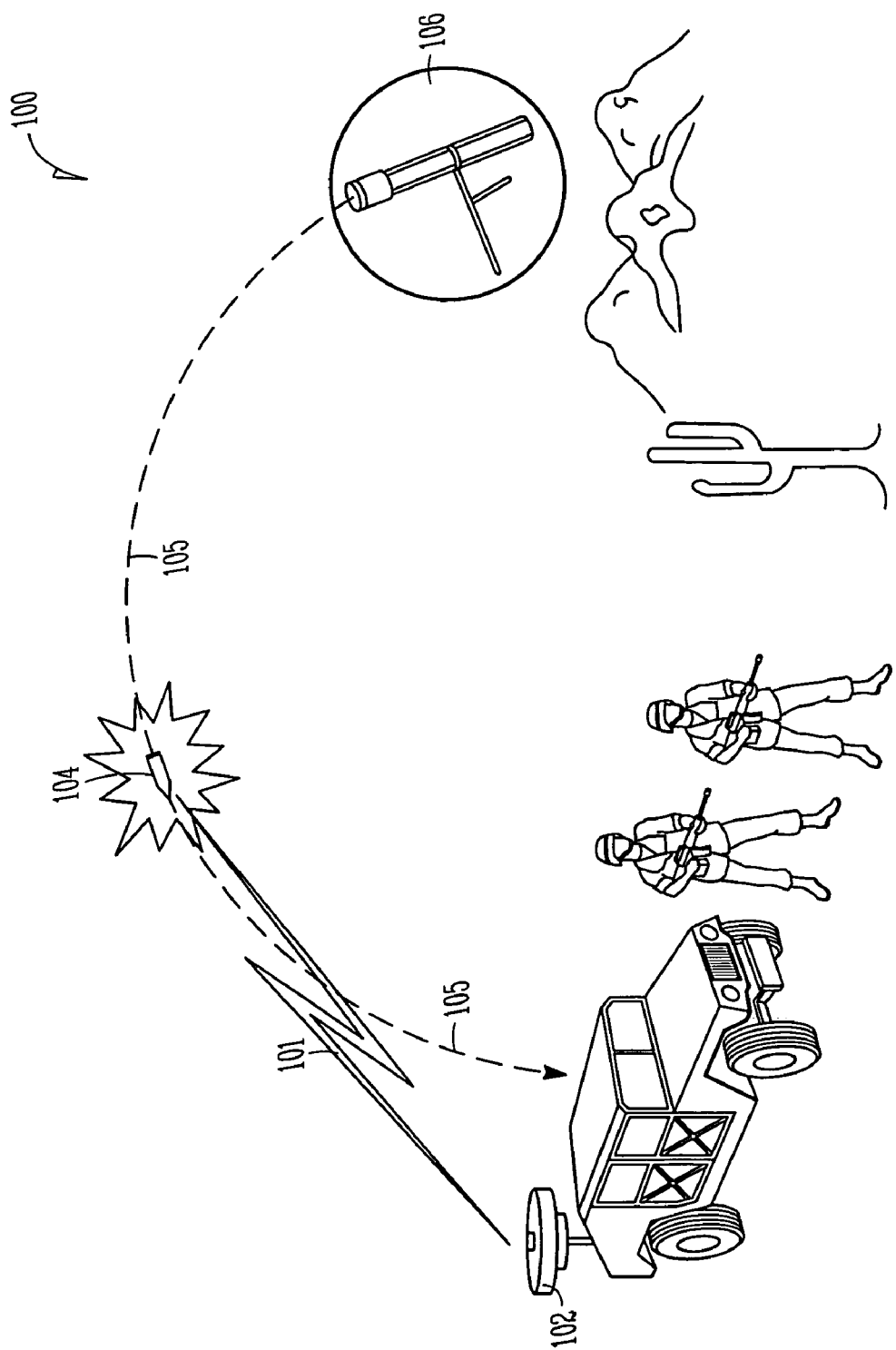
FIG. 1A OPERATIONAL ENVIRONMENT

DIRECTION FINDING SYSTEM

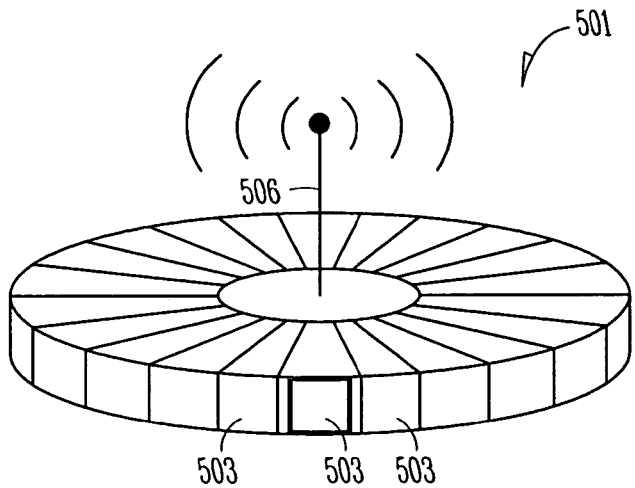
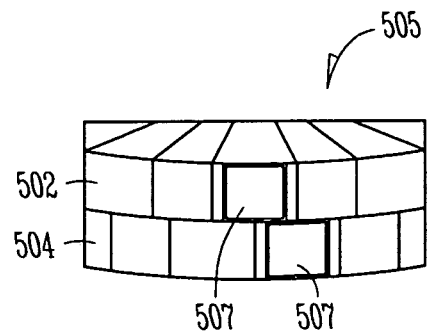
*FIG. 5A*  *FIG. 5B*
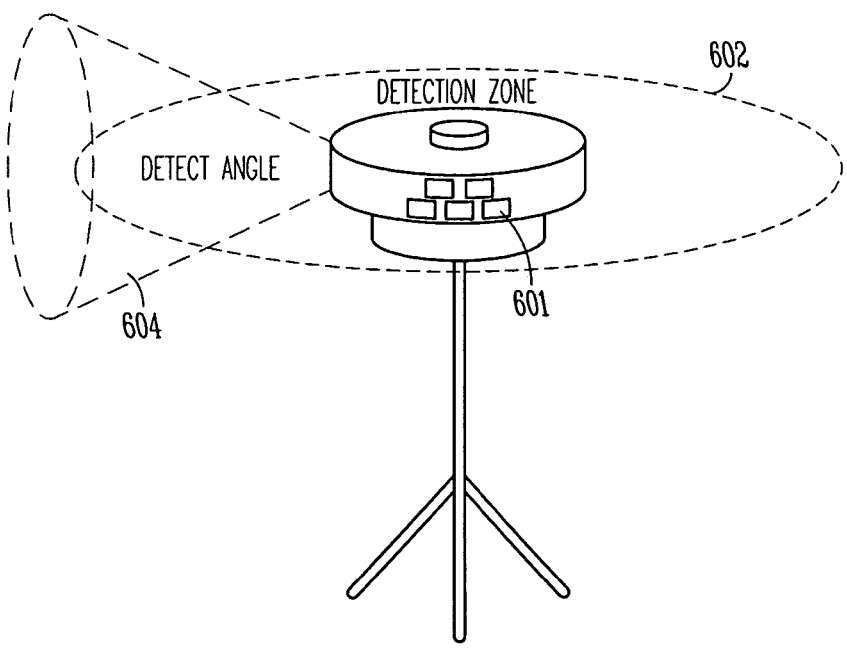
*FIG. 6*

RADAR ANGLE AND RANGE BINS

SINGLE TRANSMIT MULTI-RECEIVER MODULATION RADAR, MULTI-MODULATION RECEIVER AND METHOD

TECHNICAL FIELD

Some embodiments of the present invention pertain to radar systems. In some embodiments, the present invention relates to locating snipers. In some embodiments, the present invention relates to intercepting incoming projectiles. Some embodiments relate to locating signal sources.

BACKGROUND

Snipers are one of the many problems in urban warfare situations as well as on city streets. Snipers are difficult to locate making it difficult to protect VIPs, police and security personnel from sniper fire. Some conventional sniper-fire detection systems use audio sensing techniques to help locate the sniper after a bullet is fired, but these techniques are not very accurate and are difficult to implement. Furthermore, these techniques do not provide a way to stop the bullet. In some urban warfare situations, rocket-propelled grenades (RPGs), mortar, as well as other projectiles, present similar problems.

Some conventional radar systems have been used to track and intercept incoming projectiles, but these systems are not easily deployed in urban situations, are large, cumbersome, and expensive. Additionally these systems do not offer protection against a close combat weapon (e.g., less than 100 meters) due to the scan time of conventional systems including mechanical scanning systems and electronically scanning array (ESA) systems.

In some situations, radio frequency (RF) signal sources, such as mobile radars and hand-held-radios, or other communication devices, may indicate a possible threat to security personnel. The location, direction and/or signal characteristics of these signal sources would be useful to security personnel.

Thus, there are general needs for improved radar systems. There are also general needs for systems and methods that can help protect against sniper fire as well as other projectiles, especially in urban situations. There are also general needs for systems that can quickly and accurately determine the direction and/or signal characteristics of RF signal sources.

SUMMARY

In some embodiments, the present invention provides a single-transmit multi-receiver modulation (STMRM) radar system that may quickly and accurately detect bullets, mortar and incoming rocket-propelled grenades. In some embodiments, the system may extrapolate target trajectory and determine a shooter's location.

In some other embodiments, the present invention provides a signal source locating and passive direction-finding system that may quickly and accurately determine the direction and/or characteristics of an RF signal source.

In some radar-system, embodiments, a radar system may modulate radar return signals received through an associated receive-signal path with one of a plurality of differing modulation waveforms having low-cross correlation products. Each receive-signal path may be associated with a different direction. The differently modulated return signals from each receive-signal path may be combined and corre- lations may be performed on the combined and differently modulated radar return signals using the modulation waveforms to locate a target. In some embodiments, the trajectory of the target may be extrapolated and the target's source location may be determined.

BRIEF DESCRIPTION OF THE DRAWINGS

FIG. 1A illustrates an operational environment of a radar system in accordance with some embodiments of the present invention;

FIGS. 5A and 5B illustrate antenna element configurations in accordance with some embodiments of the present invention;

FIG. 6 illustrates a detection zone and a detection angle of a radar system in accordance with some embodiments of the present invention;

DETAILED DESCRIPTION

Figure 1B:
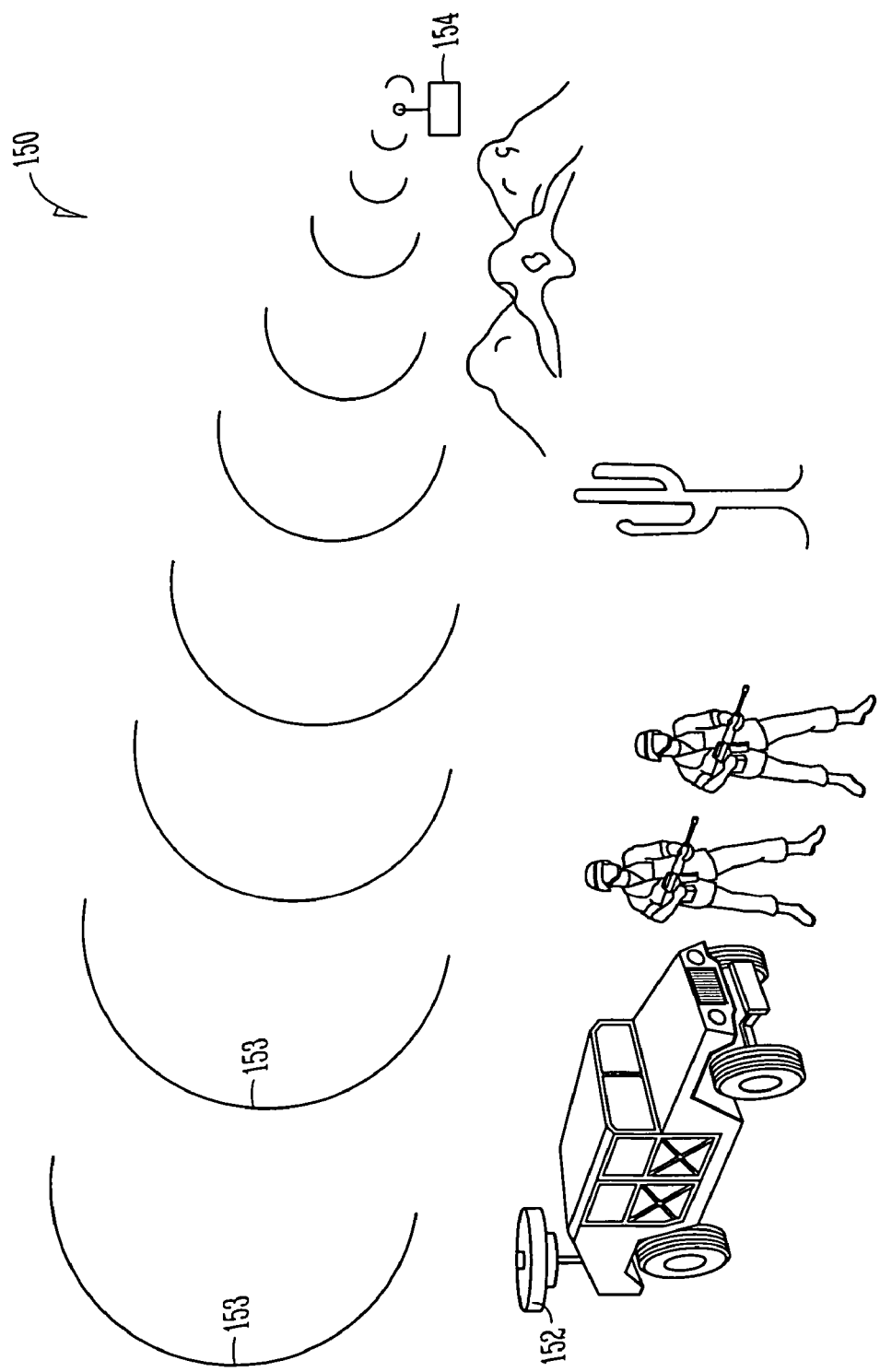
FIG. 1B illustrates an operational environment of a direction-finding and/or signal source locating system in accordance with some other embodiments of the present invention.

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

FIG. 1A illustrates an operational environment of a radar system in accordance with some embodiments of the present invention. Operational environment 100 illustrates radar system 102 which may be used to locate and detect target 104. In some embodiments, radar system 102 may also be able to calculate trajectory 105 of target 104 to determine target source location 106.

In accordance with some embodiments of the present invention, radar system 102 may modulate radar return signals received through an associated receive-signal path with one of a plurality of differing modulation waveforms. The differing modulation waveforms may have a low-cross correlation product. Each receive-signal path may be associated with a different direction. The differently modulated return signals from each receive-signal path may be combined. Correlations may be performed on the combined and differently modulated radar return signals using the modulation waveforms to detect target 104.

In some embodiments, each receive-signal path may receive signals from one of a plurality of spatially-separated antennas. The antennas may be positioned to receive signals from at least slightly different directions. In these embodiments, radar system 102 may simultaneously transmit radar signal 101 in each of the different directions. In some embodiments, radar system 102 may correlate the combined modulated radar return signals with each of the modulation waveforms and may perform Fourier transforms on correlation output signals from the correlations for use in estimating trajectory 105 of target 104.

In some embodiments, the modulation waveforms used to modulate the signals received through each receive-signal path may comprise a plurality of waveforms generated from substantially orthogonal code sequences, although the scope of the invention is not limited in this respect. In some embodiments, the modulation waveforms may comprise either pseudo-orthogonal waveforms or quadratic-polyphase waveforms although the scope of the invention is not limited in this respect. These embodiments are described in more detail below. In some embodiments, radar system 102 may interpolate between correlation output signals associated with different antennas to estimate an azimuth angle and an elevation angle of target 104.

In some embodiments, radar system 102 is a single-transmit multi-receiver modulation (STMRM) radar system that may quickly and accurately detect bullets, mortar and incoming rocket-propelled grenades (RPGs). In some embodiments, the system may extrapolate a target trajectory and determine a shooter's location, although the scope of the invention is not limited in this respect.

FIG. 1B illustrates an operational environment of a direction-finding and/or signal source locating system in accordance with some other embodiments of the present invention. Operational environment 150 illustrates system 152 which may determine a direction and/or location of RF signal source 154. In some embodiments, the signal characteristics of RF signal source 154 may be further identified.

In these embodiments, system 152 may modulate signals 153 received from signal source 154 through an associated receive-signal path with one of a plurality of differing modulation waveforms. The differing modulation waveforms may have a low-cross correlation product. Each receive-signal path may be associated with a different direction. The modulated signals from each receive-signal path may be combined. System 152 may further perform correlations on the combined modulated signals using the modulation waveforms to determine a direction, frequency and/or signal characteristics of the signal source. Embodiments of system 152 are discussed in more detail below.

Figure 2:
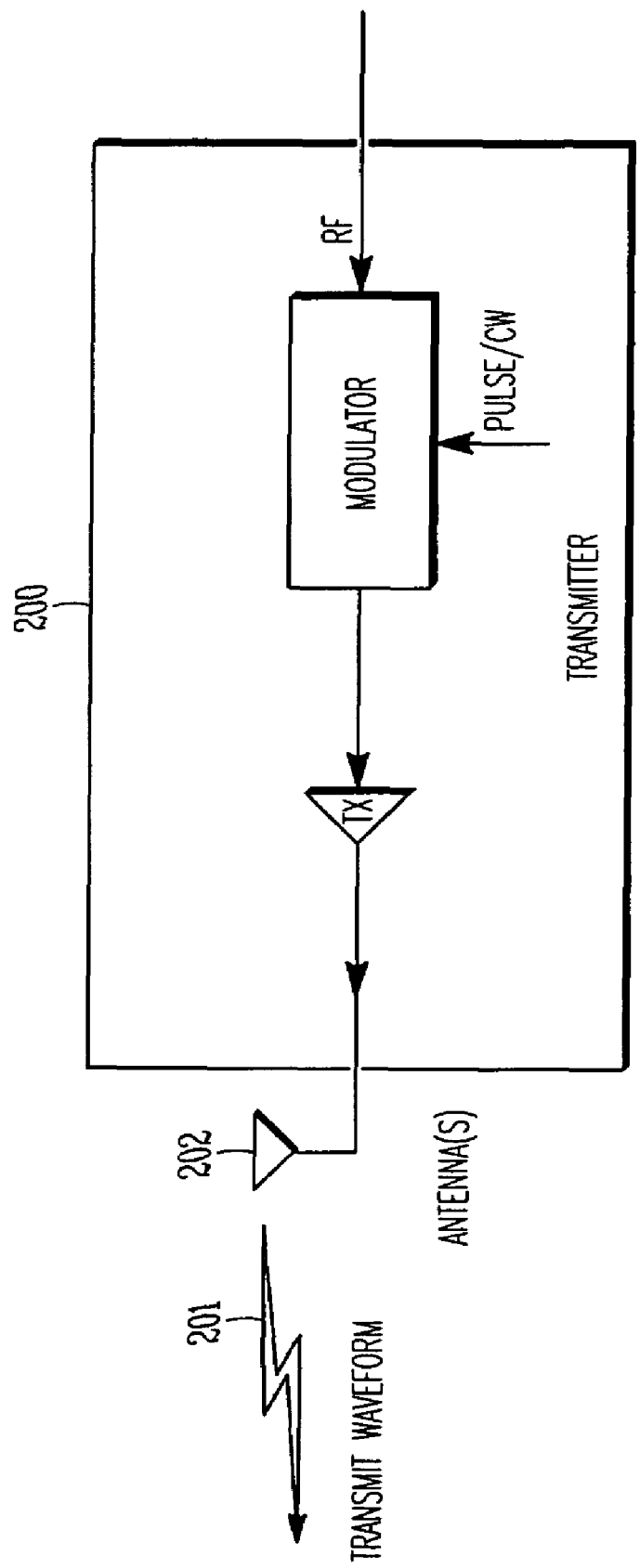
FIG. 2 is a block diagram of a transmitter in accordance with some embodiments of the present invention.

FIG. 2 is a block diagram of a transmitter in accordance with some embodiments of the present invention. Transmitter 200 may be used by radar system 102 (FIG. 1A) for transmitting a radar signal. In some radar-system embodiments, transmitter 200 may transmit waveform 201, which may be, for example, either a carrier-wave (CW) or pulse-modulated radar signal, using one or more antenna, such as antenna 202. The operations of transmitter 200 are described in more detail below. In some of these embodiments, radar-system 102 (FIG. 1A) may be either a bi-static radar or a mono-static radar and may transmit almost any type of transmit waveform 201.

Figure 3:
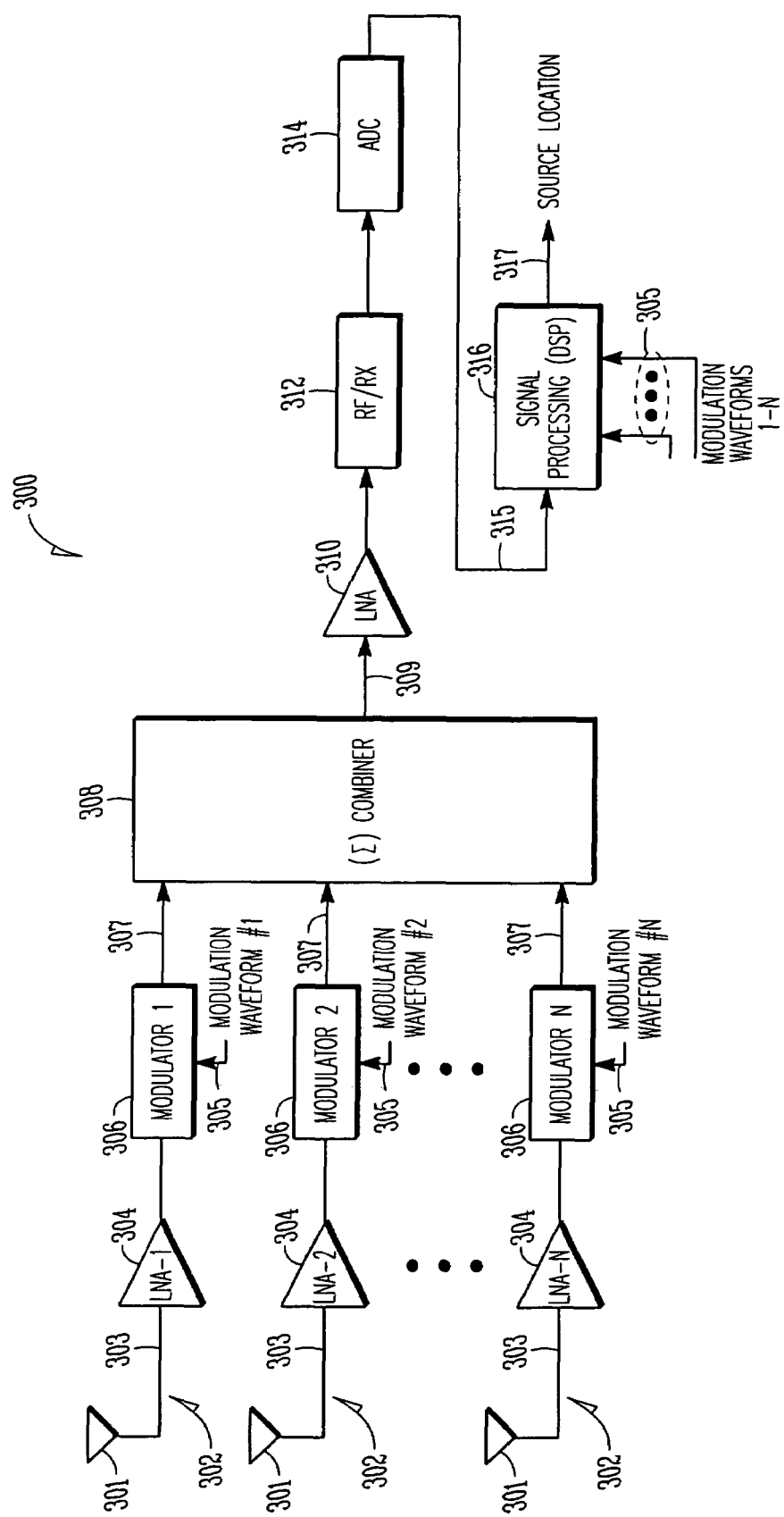
FIG. 3 is a block diagram of a receiver in accordance with some embodiments of the present invention.

FIG. 3 is a block diagram of a receiver in accordance with some embodiments of the present invention. Receiver 300 is a multi-channel receiver that may be part of a multi-receiver modulation receiver which may be suitable for use in radar system 102 (FIG. 1A) and system 152 (FIG. 1B). Receiver 300 includes a plurality of receive-path modulators 306. Each modulator 306 may modulate signals 303 received through an associated receive-signal path 302 with one of a plurality of differing modulation waveforms 305. Differing modulation waveforms 305 may have a low-cross correlation product. Receiver 300 also includes combining circuitry 308 to combine modulated receive signals 307 from each receive-signal path 302. Receiver 300 also includes signal processing circuitry 316. Signal processing circuitry 316 may perform correlations on modulated and combined signals 315 using the modulation waveforms 305. As illustrated in FIG. 3, N different modulation waveforms 305 may be used to modulate signals received through N receive-signal paths. N may correspond to the number of receive antennas 301.

In some embodiments, each modulator 306 may be associated with one receive-signal path 302 or receiver channel. In some embodiments, the cross-correlation between each of modulation waveforms 305 may be low. For example, in some embodiments, a family of pseudo-orthogonal waveforms may be used, while in other embodiments, quadratic-polyphase waveforms may be used.

In some radar-system embodiments, the outputs of the correlations performed by signal processing circuitry 316 may be used to determine a target's location and/or a target's trajectory, although the scope of the invention is not limited in this respect. In some direction-finding and signal source locating embodiments, the output of the correlations may be used to determine the location of an RF signal source and/or the signal or frequency characteristics of an RF signal source, such as signal source 154 (FIG. 1B), although the scope of the invention is not limited in this respect.

In some embodiments, modulation waveforms 305 may comprise a plurality of substantially-orthogonal waveforms. In some embodiments, modulation waveforms 305 may comprise a family of pseudo-orthogonal waveforms generated from pseudo-orthogonal codes, although the scope of the invention is not limited in this respect.

In some embodiments, modulators 306 may comprise phase modulators which may phase-modulate signals received through associated receive-signal path 302 with one of the pseudo-orthogonal waveforms. The pseudo-orthogonal waveforms may be coded waveforms generated from a family of pseudo-orthogonal codes. The dot product of any two of the pseudo-orthogonal codes used to generate the family of pseudo-orthogonal waveforms is substantially zero.

In some embodiments, modulators 306 may be bi-phase modulators which may be used to phase modulate signals received through the associated receive-signal path 302 with a phase of either zero degrees or one-hundred eighty degrees in accordance with ones and zeros of one of the pseudo-orthogonal codes, although the scope of the invention is not limited in this respect.

In some embodiments, receiver 300 may also comprise a code generator to generate the codes for use in generating the waveforms for association with each receive-signal path 302. In some other embodiments, the waveforms may be generated by a source external to the receiver and may be stored in a memory of receiver 300 for use by the each modulator 306. In some embodiments, pseudo-orthogonal codes may be generated from a Walsh seed matrix, although the scope of the invention is not limited in this respect.

In some alternate embodiments, modulators 306 may comprise polyphase modulators. In these embodiments, modulation waveforms 305 may be generated from a series of phase states of a quadratic polyphase waveform. Each modulator may simultaneously apply one of the phase states to received signals of the associated receive-signal path 302. In these embodiments, polyphase modulators may modulate the received signals with a quadratic phase code associated with the quadratic polyphase waveform. These embodiments may be referred to as simultaneously quadratic polyphase waveform (SQPPW) embodiments, although the scope of the invention is not limited in this respect.

In some embodiments, the phase-states of the quadratic polyphase waveform have a frequency spacing therebetween being inversely related to a code length of the phase code. In some embodiments, the phase states of the quadratic polyphase waveform may be determined from $\pi n2/N$, where n is a phase state number and ranges from one to a total number of the phase states, and where N is a total number of the phase states and is greater than or equal to sixteen and less than or equal to 128, although the scope of the invention is not limited in this respect.

In some other embodiments, modulators 306 may comprise amplitude modulators to amplitude-modulate the signals received through each receive-signal path 302 with a differing waveform. In some other embodiments, modulators 306 may comprise pulse-position modulators to pulse-position modulate (PPM) signals received through the associated receive-signal path 302 with substantially orthogonal pulse-position waveforms. In PPM embodiments, the temporal positions of pulses may be varied in accordance with some characteristic of the modulating signal. In these embodiments, the amplitude and width of the pulse may be kept constant, and the position of each pulse, in relation to the position of a recurrent reference pulse may be varied by each instantaneous sampled value of the modulating wave, although the scope of the invention is not limited in this respect. In some other embodiments, pulse-amplitude modulation (PAM) may be used, although the scope of the invention is not limited in this respect.

As illustrated, each receive-signal path 302 may receive signals from an associated one of a plurality of spatially-separated antennas 301. Antennas 301 positioned to receive signals from at least slightly different directions. Some examples of antenna configuration are described in more detail below.

Receiver 300 may also include amplifiers 304 associated with each receive-signal path 302 to amplify signals received through an associated one of antennas 301. Receiver 300 may also include amplifier 310 to amplify combined modulated receive signals 309 and RF receiver (RX) circuitry 312 to downconvert combined modulated receive signals 309 to baseband, although this is not a requirement. Amplifiers 304 and amplifier 310 may be low-noise amplifiers (LNAs), although the scope of the invention is not limited in this respect. The location of amplifiers may be different than illustrated in FIG. 3. Receiver 300 may also include one or more analog-to-digital converters (ADCs) 314 to sample and digitize the combined signal to generate a single digital signal (i.e., combined signals 315). Combined signals 315 may comprise a single-digital waveform comprising modulated return signals from each of antennas 301. In some embodiments, combining circuitry 308 comprises a signal combiner to sum the modulated signals from each of antennas 301 into single receiver channel signal.

In some radar-system embodiments, signal processing circuitry 316 may generate one or more output signals 317 which may include, among other things, target location (e.g., elevation and azimuth angle), target velocity, target trajectory 105 (FIG. 1A) and/or target source location 106 (FIG. 1A). In some direction-finding and signal source locating embodiments, signal processing circuitry 316 may generate one or more output signals 317 which may include, for example, frequency of signal source 154 (FIG. 1B), location of signal source 154 (FIG. 1B) and/or other characteristics of signal source 154 (FIG. 1B), such as whether signal source is a radar system, a two-way radio, or a mobile telephone, for example.

In some embodiments, antennas 301 may be positioned circumferentially to receive signals over about a 360 degree detection zone in azimuth and a detection angle of up to about sixty degrees in elevation, although the scope of the invention is not limited in this respect. Examples of these embodiments are illustrated in FIGS. 5A, FIG. 5B and FIG. 6 discussed below.

Figure 4:
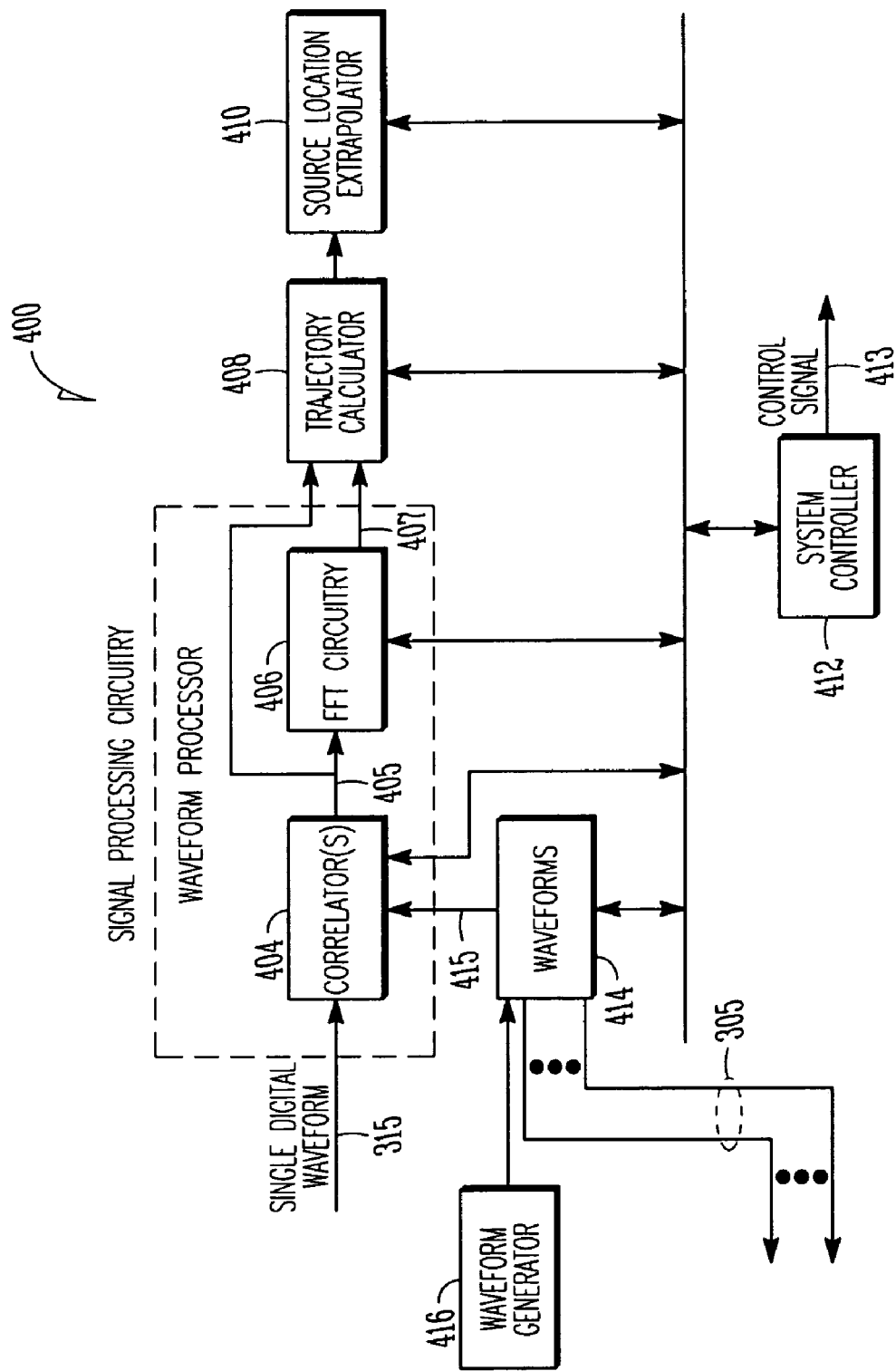
FIG. 4 is a functional block diagram of signal processing circuitry in accordance with some embodiments of the present invention.

FIG. 4 is a functional block diagram of signal processing circuitry in accordance with some embodiments of the present invention. Signal processing circuitry 400 may be suitable for use as signal processing circuitry 316 (FIG. 3), although other signal processing circuitry configurations may be used.

In some embodiments, signal processing circuitry 400 may include one or more correlators 404 to correlate combined modulated radar return signals 315 (which may comprise a single digital waveform) with each of modulation waveforms 415. Modulation waveforms 415 may correspond to modulation waveforms 305 (FIG. 3) and may comprise a different modulation waveform for each receive-signal path 302 (FIG. 3). Signal processing circuitry 400 may also include Fourier transform circuitry 406 to perform Fourier transforms, such as fast Fourier transforms (FFTs), on correlation output signals 405 from the one or more correlators 404. In some embodiments, correlators 404 may accumulate and/or sum correlation outputs from each correlation for use by Fourier transform circuitry 406. In some embodiments, an N-point FFT may be performed on the correlation outputs where N corresponds to the number of receive-signal paths 302 (FIG. 3) or the number of receive antennas 301 (FIG. 3). In some embodiments, N may range from as few as four and 16 to as great as 56, 128, 256 or more.

In some radar system embodiments, signal processing circuitry 400 may further include trajectory calculator 408 to interpolate between correlation output signals 405 associated with different antennas to estimate an azimuth angle of a target. Trajectory calculator 408 may also estimate an elevation angle of the target based on differences between outputs of the correlations associated with the differing modulation waveforms 305 (FIG. 3) used to modulate signals received from the antenna elements when different sets of antennas are used for different elevation angles. This is discussed in more detail below.

In some embodiments, correlators 404 may comprise a single correlator to perform correlations on combined signals 315 for each of modulations waveforms 415 in a serial manner, although the scope of the invention is not limited in this respect. In some other embodiments correlators 404 may comprise a plurality of correlators to perform substantially simultaneous correlations (i.e., in parallel) with more than one of modulation waveforms 415 on combined signals 315, although the scope of the invention is not limited in this respect.

In some embodiments, trajectory calculator 408 may also estimate a velocity of a target based on frequency-domain samples 407 provided by FFT circuitry 406 and a range of the target based on a sample rate of ADC circuitry 314 (FIG. 3), although the scope of the invention is not limited in this respect.

In some embodiments, trajectory calculator 408 may calculate the trajectory using an azimuth angle, a velocity, a range and/or an elevation angle. In some embodiments, signal processing circuitry 400 may also comprise source location extrapolator 410 to estimate a source location of a target based on the trajectory. In some embodiments, system controller 412 may generate control signal 413 which may be used to launch a counter weapon at the source location, although the scope of the invention is not limited in this respect. In some embodiments, system controller 412 may generate control signal 413 to control an interceptor toward the target based on the trajectory, although the scope of the invention is not limited in this respect. In these embodiments, control signal 413 may include location coordinates of the source location or may include trajectory information.

In some embodiments, receiver 300 may further comprise a global positioning system (GPS) receiver to generate global location coordinates of the system. In these embodiments, the positioning system may further generate location coordinates of the source location based on the location coordinates of the system, although the scope of the invention is not limited in this respect.

In some direction-finding and signal source locating embodiments, signals received through the receive-signal paths 302 (FIG. 3) comprise signals from RF signal source 154 (FIG. 1B). In these embodiments, correlators 404 may correlate combined modulated receive signals 315 with each of modulation waveforms 415 and Fourier transform circuitry 406 may perform Fourier transforms on correlation output signals 405 for use estimating a direction to signal source 154 (FIG. 1B). In some embodiments, the outputs of Fourier transform circuitry 406 may also be used to identify the frequency and other characteristics of a signal source.

In some embodiments, each modulation waveform 415 may be stored in waveform storage element 414. In some embodiments, modulation waveforms 415 may be generated by waveform generator 416, although the scope of the invention is not limited in this respect. In some embodiments, waveform generator may be a code generator and may generate substantially orthogonal code sequences for use in generating differing modulation waveforms 415, although the scope of the invention is not limited in this respect.

Although receiver 300 (FIG. 3) and signal processing circuitry 400 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of receiver 300 (FIG. 3) and signal processing circuitry 400 may refer to one or more processes operating on one or more processing elements.

FIGS. 5A and 5B illustrate antenna element configurations in accordance with some embodiments of the present invention. In FIG. 5A, antenna configuration 501 comprises a plurality of antenna elements 503 arranged circumferentially in a single layer. In these embodiments, each of antenna elements 503 may correspond to one of antennas 301 (FIG. 3). In FIG. 5B, antenna configuration 505 comprises a first set 502 of antenna elements 507 and a second set 504 of antenna elements 507. In these embodiments, each of antenna elements 507 may also correspond to one of antennas 301 (FIG. 3). First set 502 may be positioned with respect to a first elevation and second set 504 may be positioned with respect to a second elevation. Antenna configuration 505 may be used to provide enhanced elevation angular resolution.

In some pseudo-orthogonal waveform embodiments, trajectory calculator 408 (FIG. 4) may estimate an elevation angle of a target based on differences between correlation output signals 405 (FIG. 4) associated with the signals received through the antenna elements of first set 502 and second set 504 of configuration 505, although configuration 501 may also be used to estimate an elevation angle of a target.

In some embodiments, antenna elements 503 may comprise horn antennas although the scope of the invention is not limited in this respect. In some embodiments, antenna elements 507 may comprise horn antennas in a stacked configuration, although the scope of the invention is not limited in this respect. In some embodiments, the number of antenna elements of either configuration 501 or 505 may vary from as little as four to as much as sixteen or greater depending on the application requirements and the beamwidth of the antenna elements.

FIG. 6 illustrates a detection zone and a detection angle of a radar system in accordance with some embodiments of the present invention. Antenna elements 601 may be positioned circumferentially to, in combination, cover detection zone 602 of up to approximately 360-degrees in azimuth and detection angle 604 of up to sixty degrees or greater in elevation, although the scope of the invention is not limited in this respect. Antenna elements 601 may correspond to antenna elements 503 (FIG. 5A) or antenna elements 507 (FIG. 5B).

Although some embodiments of the present invention are described with respect to antenna elements positioned circumferentially, this is not a requirement. In other embodiments, antenna elements may be positioned in other ways, such as on a flat, spherical or other surface depending on the application.

In some radar-system embodiments, radar transmitter 200 (FIG. 2) may transmit radar signal 201 (FIG. 2) and the radar returns may be received from a target through more than one of receive antennas 301 (FIG. 3). In some embodiments, radar transmitter 200 (FIG. 2) may use a single substantially omnidirectional antenna, such as antenna 506 (FIG. 5A), to transmit radar signal 201. In these embodiments, antenna 506 (FIG. 5A) may correspond to antenna 202 (FIG. 2).

In some alternate embodiments, radar transmitter 200 (FIG. 2) may use a plurality of antennas to simultaneously transmit radar signal 201 in the directions associated with the receive antennas. In some embodiments, a separate set of transmit antennas may be used, while in other embodiments, receive antennas 301 (FIG. 3) may be used for transmitting as well as receiving. For example, radar transmitter 200 (FIG. 2) may use antenna elements 503 (FIG. 5A) or antenna elements 507 (FIG. 5B) to transmit radar signals to cover detection zone 602 (FIG. 6) and/or detection angle 604 (FIG. 6). In these embodiments, a circulator or other RX/TX signal-separating element may be used to allow the reception and transmission of signals through each antenna, although the scope of the invention is not limited in this respect.

Figure 7A:
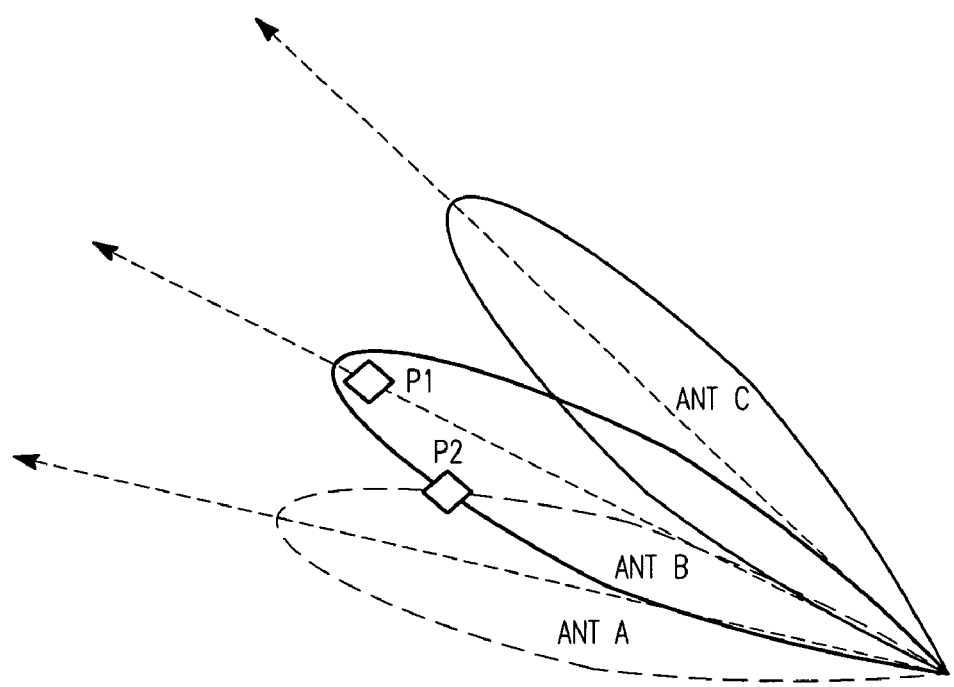
FIGS. 7A, 7B & 7C illustrate examples of target locations in antenna beams and magnitudes of associated correlation output signals in accordance with some embodiments of the present invention.
Figure 7B:
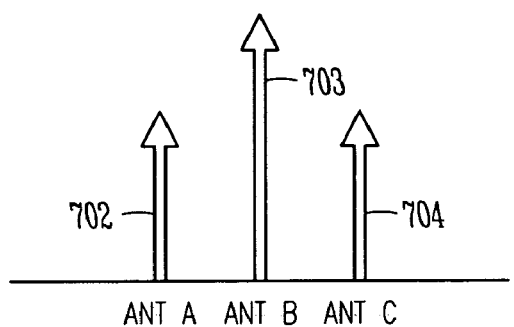
Figure 7C:
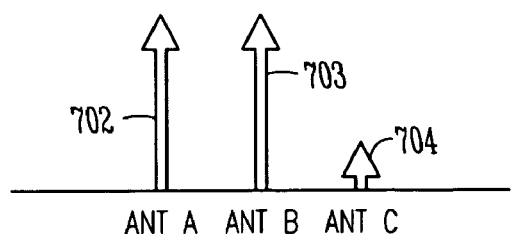

FIGS. 7A, 7B & 7C illustrate examples of target locations in antenna beams and magnitudes of associated correlation output signals in accordance with some embodiments of the present invention. FIG. 7A illustrates three antenna beams (i.e., antenna A, antenna B and antenna C) which may correspond to antenna beams of three of antennas 301 (FIG. 3). FIG. 7B illustrates the relative magnitude of correlations produced by the correlation of return signals associated the three antennas of FIG. 7A for a target in position P1. FIG. 7C illustrates the relative magnitude of correlations produced by the correlation of return signals associated the three antennas of FIG. 7A for a target in position P2. The correlations may be provided as correlation outputs by correlators 404 (FIG. 4) by performing correlations on combined modulated receive signals 315 (FIG. 3).

As illustrated in FIG. 7B, antenna B provides the greatest correlation output magnitude, while antennas A and C provide lower and approximately equal correlation output magnitudes. This may indicate that the target is located in an angular position toward the center of the antenna beam associated with antenna B. As illustrated in FIG. 7C, antennas A and B provide greater and approximately equal correlation output magnitudes, while antenna C provides a much lower correlation output magnitude. This may indicate that the target is now located in an angular position approximately equally between antennas A and B, and further from antenna C.

Correlation outputs 702 for antenna A may be generated by correlating combined modulated signals 315 (FIG. 3) with the particular modulation waveform 305 (FIG. 3) that used to modulate the signals received by antenna A. Similarly, correlation outputs 703 for antenna B may be generated by correlating combined modulated signals 315 (FIG. 3) with the particular modulation waveform 305 (FIG. 3) that used to modulate the signals received by antenna B. Similarly, correlation outputs 704 for antenna C may be generated by correlating combined modulated signals 315 (FIG. 3) with the particular modulation waveform 305 (FIG. 3) that used to modulate the signals received by antenna C.

In some embodiments, the antenna elements may be arranged to cover various angles in both elevation and azimuth. As illustrated in FIGS. 7A, 7B & 7C, correlation outputs 702, 703 and 704 may be used to accurately estimate angular positions of a target. In some embodiments, the antenna beams illustrated in FIG. 7A may be directed to cover various azimuth angles and/or various elevation angles.

Figure 7D:
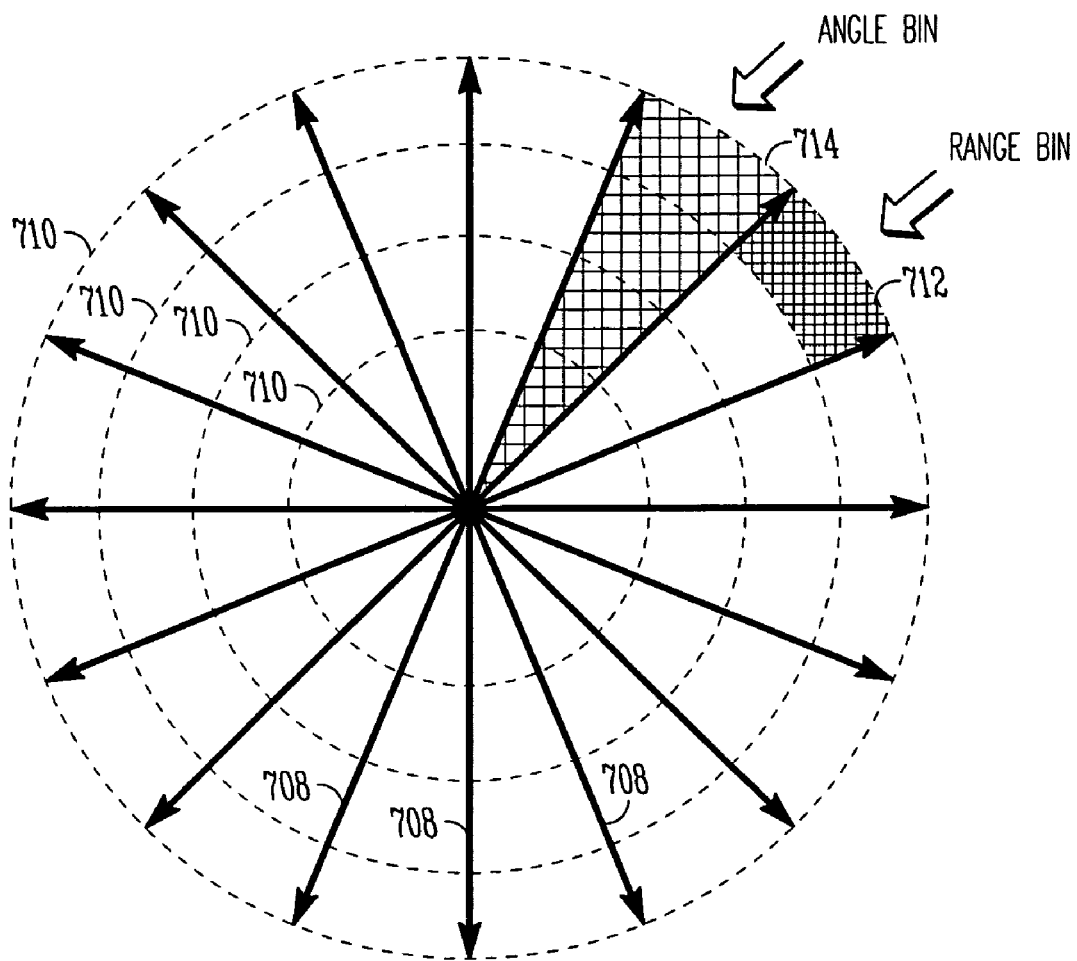
FIG. 7D illustrates an example of detected radar angle and range bins in accordance with some embodiments of the present invention.

FIG. 7D illustrates an example of detected radar angle and range bins in accordance with some embodiments of the present invention. In FIG. 7D, range bins correspond to circles 710 have the same diameter, and angle bins are illustrated as separated by outward vectors 708. In some radar-system embodiments of the present invention, range bin 712 and angle bin 714 are associated with a target and may be identified by signal processing circuitry 316 (FIG. 3).

Figure 8:
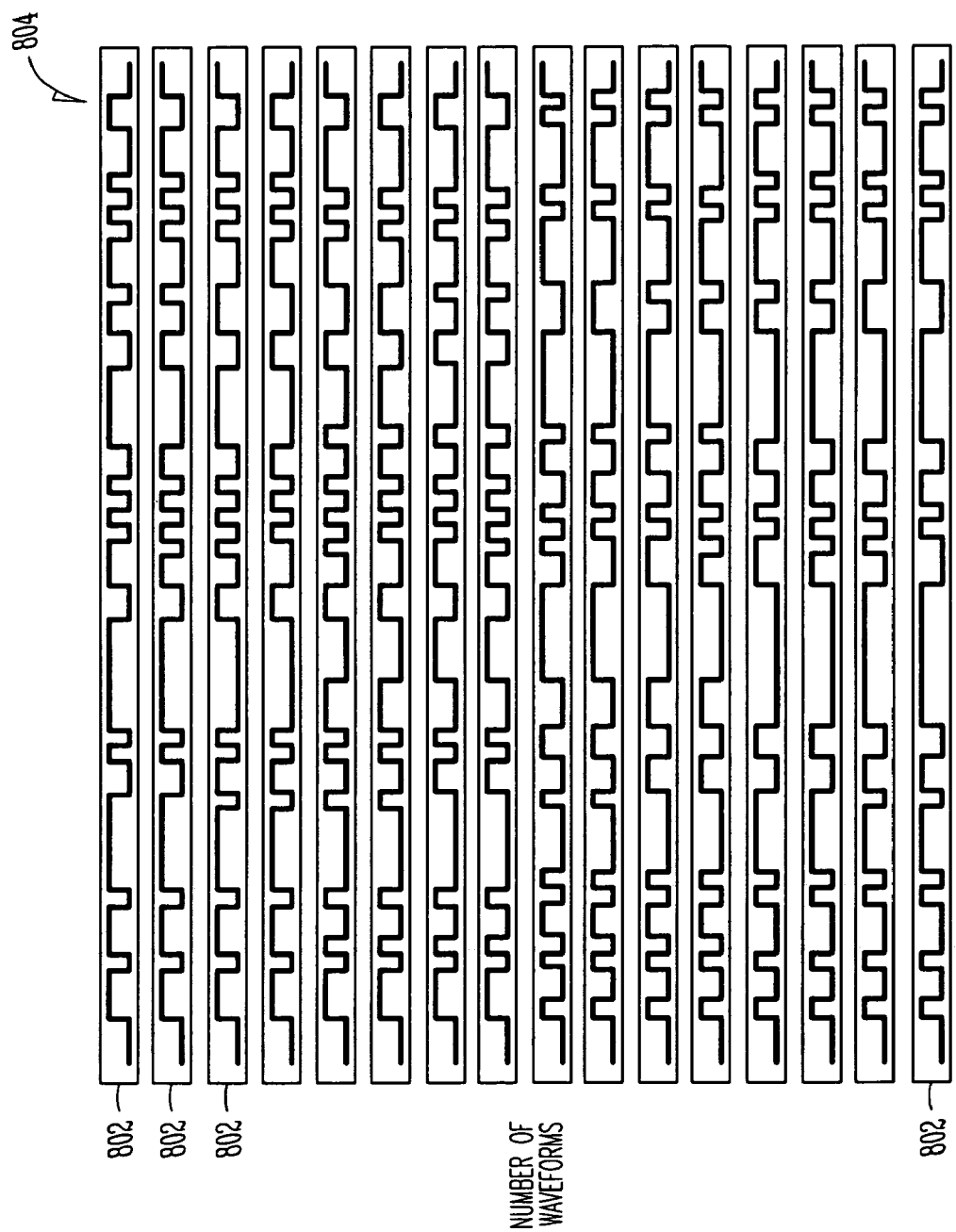
FIG. 8 illustrates examples of bit values for phase-modulation of pseudo-orthogonal waveforms in accordance with some embodiments of the present invention.

FIG. 8 illustrates examples of bit-values for phase-modulation of pseudo-orthogonal waveforms in accordance with some pseudo-orthogonal waveform embodiments of the present invention. In this example, sixteen 64-bit bi-phase modulated orthogonal waveforms 802 are illustrated that may be used as modulation waveforms 305 (FIG. 3) for modulation of receive signals from sixteen of antennas 301 (FIG. 3). Bit values for each waveform may be associated with bit numbers 804 and may correspond to bits of the codes, such as pseudo-orthogonal codes. In theses embodiments, a dot product between any two of the codes may be substantially zero (e.g., more than 20 dB lower than a correlation peak).

Figure 9:
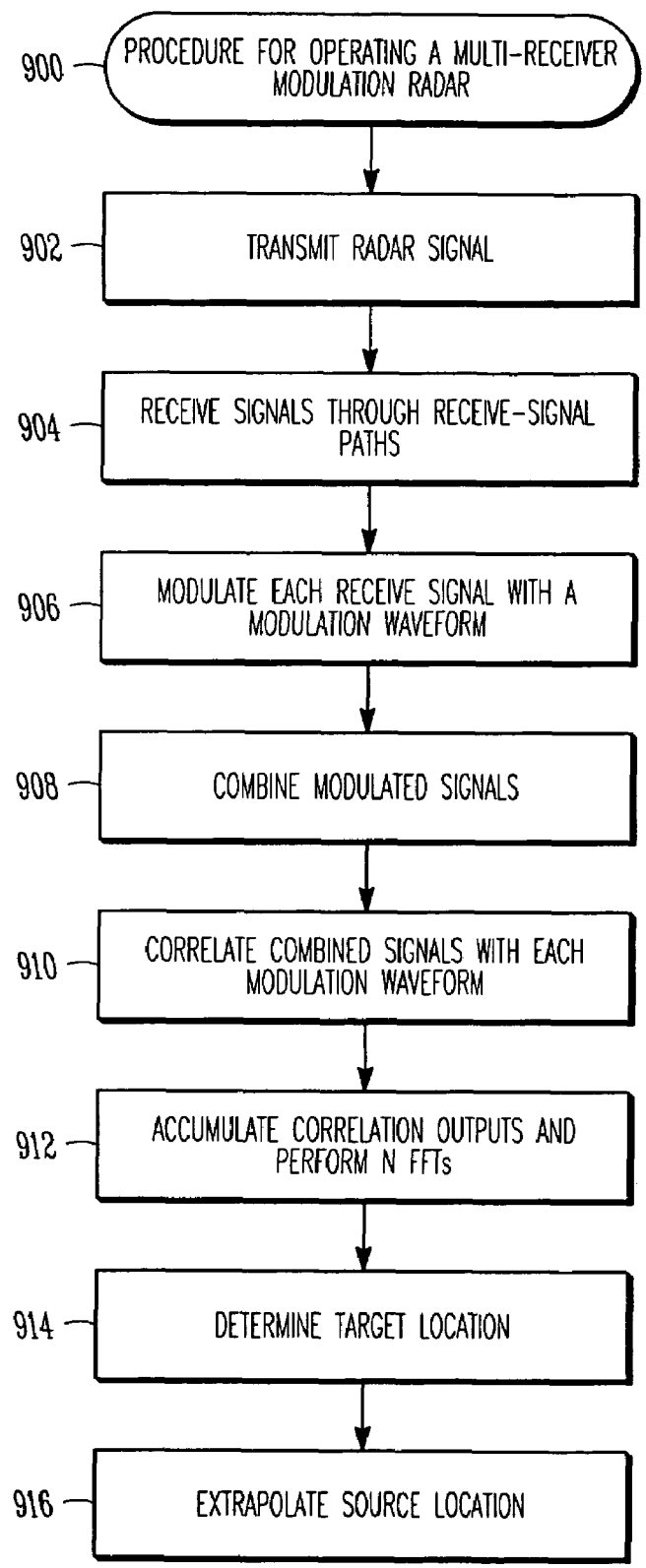
FIG. 9 is a flow chart of a procedure for operating a multi-receiver modulator radar in accordance with some embodiments of the present invention.

FIG. 9 is a flow chart of a procedure for operating a multi-receiver modulator radar in accordance with some embodiments of the present invention. Procedure 900 may be performed by a radar system, such as radar system 102 (FIG. 1A) to locate a target. In some embodiments, the trajectory of the target may be extrapolated and the source of the target may be determined (i.e., where the target came from).

In operation 902, a radar signal is transmitted. In some embodiments, transmitter 200 (FIG. 3) may be used to transmit the radar signal. The radar signal may be transmitted simultaneously in many directions to cover predetermined azimuth and/or elevation angles.

In operation 904, radar-return signals are received through a plurality of receive-signal paths, such as receive-signals paths 302 (FIG. 3).

In operation 906, the radar return signals from each receive-signal path are modulated with a different waveform, such as modulation waveforms 305 (FIG. 3). Operation 906 may be performed by modulators 306 (FIG. 3).

In operation 908, the modulated return signals from each receive-signal path may be combined into a single channel signal, such as combined modulated receive signals 315 (FIG. 3). Operation 908 may be performed by combining circuitry 308 (FIG. 3).

In operation 910, the combined signal may be correlated with each of the different modulation waveforms that were used to modulate the radar-return signals received through each receive-signal path. Operation 910 may be performed by signal processing circuitry 316 (FIG. 3) and may be performed by correlators 404 (FIG. 4).

In operation 912, the correlation outputs may be accumulated for several samples and a Fourier transform may be performed on the correlation outputs. In some embodiments, an N-point FFT may be performed on the correlation outputs. N may correspond to the number of receive-signal paths 302 (FIG. 3) and/or the number of receive antennas 301 (FIG. 3). In some embodiments, the signals may be generated from a single radar signal transmission, although the scope of the invention is not limited in this respect.

In operation 914, the target's location (e.g., elevation and azimuth angle), velocity, and/or trajectory may be determined from the correlation outputs and/or the Fourier transform output.

In operation 916, a target source location, such as target source location 106 (FIG. 1) may be determined. In some embodiments, operation 916 may include initiating countermeasures, although the scope of the invention is not limited in this respect.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Although the individual operations of procedure 900 are illustrated and described as separate operations, one or more of the individual operations may be performed concurrently, and nothing requires that the operations be performed in the order illustrated.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features may be occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A receiver comprising:
    a plurality of modulators, each modulator to modulate signals received through an associated receive-signal path with one of a plurality of differing modulation waveforms having a low-cross correlation product;
    combining circuitry to combine the modulated signals from each receive-signal path; and
    signal processing circuitry to perform correlations on the modulated combined signals using the modulation waveforms.

2. The receiver of claim 1 wherein the modulation waveforms comprise a plurality of substantially-orthogonal waveforms.

3. The receiver of claim 1 wherein the modulation waveforms comprise a family of pseudo-orthogonal waveforms generated from pseudo-orthogonal codes.

4. The receiver of claim 3 wherein the modulators comprise phase modulators to phase-modulate signals received through the associated receive-signal path with one of the pseudo-orthogonal waveforms.

5. The receiver of claim 4 wherein a dot product of any two of the pseudo-orthogonal codes used to generate the family of pseudo-orthogonal waveforms is substantially zero.

6. The receiver of claim 4 wherein the phase modulators comprise bi-phase modulators to phase modulate signals received through the associated receive-signal path with a phase of either zero degrees or one-hundred eighty degrees in accordance with ones and zeros of one of the pseudo-orthogonal codes.

7. The receiver of claim 1 wherein the modulators comprise polyphase modulators, and
    wherein the modulation waveforms are generated from a series of phase states of a quadratic polyphase waveform, wherein each modulator applies one of the phase states to received signals of the associated receive-signal path.

8. The receiver of claim 7 wherein the polyphase modulators modulate the received signals with a quadratic phase code associated with the quadratic polyphase waveform.

9. The receiver of claim 1 wherein the modulators comprise amplitude modulators to amplitude-modulate the signals received through each receive-signal path with a differing waveform.

10. The receiver of claim 1 wherein the modulators comprise pulse-position modulators to pulse-position modulate signals received through the associated receive-signal path with the substantially orthogonal pulse-position waveforms.

11. The receiver of claim 1 wherein each receive-signal path receives signals from an associated one of a plurality of spatially-separated antennas, the antennas positioned to receive signals from at least slightly different directions.

12. The receiver of claim 11 wherein the antennas are positioned circumferentially to receive signals over about a 360 degree detection zone in azimuth and a detection angle of up to about 60 degrees in elevation.

13. The receiver of claim 11 wherein the signals received through the receive-signal paths comprise radar returns from a target, and
    wherein signal processing circuitry further comprises a trajectory calculator to interpolate between correlation output signals associated with different antennas to estimate an azimuth angle of the target.

14. The reciver of claim 13 wherein the plurality of antennas comprise a first set of antenna elements positioned with respect to a first elevation and a second set of antenna elements positioned with respect to a second elevation, and
    wherein the trajectory calculator is to further estimate an elevation angle of the target based on differences between outputs of the correlations associated with the differing modulation waveforms used to modulate signals received from the antenna elements of the first and second sets.

15. The receiver of claim 13 wherein signal processing circuitry comprises:
    one or more correlators to correlate combined modulated radar return signals with each of the modulation waveforms; and
    fast-Fourier transform (FFT) circuitry to perform fast-Fourier transforms (FFTs) on correlation output signals from the one or more correlators for use in estimating a trajectory of the target.

16. The receiver of claim 15 wherein the trajectory calculator is to further estimate a velocity of the target based on frequency-domain samples provided by the FFT circuitry and a range of the target based on a sample rate of analog-to-digital conversion circuitry used to digitize the combined return signals.

17. The reciver of claim 13 wherein the target comprises at least one of an incoming projectile, a bullet, a rocket, a rocket-propelled grenade (RPG), a mortar shell, a missile and networked munitions.

18. The receiver of claim 11 wherein the signals received through the receive-signal paths comprise signals from a radio-frequency (RF) signal source;
wherein signal processing circuitry comprises:
one or more correlators to correlate the combined signal with each of the modulation waveforms; and
fast-Fourier transform (FFT) circuitry to perform fast-Fourier transforms (FFTs) on correlation output signals from the one or more correlators for use estimating a direction to the signal source.

19. A radar system comprising:
a plurality of modulators, each modulator to modulate radar return signals received through an associated receive-signal path with one of a plurality of differing modulation waveforms;
combining circuitry to combine the differently modulated return signals from each receive-signal path, each receive-signal path being associated with a different direction; and
signal processing circuitry to perform correlations on the combined and differently modulated radar return signals using the modulation waveforms to determine a location of a target.

20. The radar system of claim 19 wherein each receive-signal path receives signals from an associated one of a plurality of spatially-separated antennas, the antennas positioned to receive signals from at least slightly different directions, and
wherein the system further comprises a transmitter to simultaneously transmit a radar signal in each of the at least slightly different directions.

21. The radar system of claim 20 wherein the signal processing circuitry comprises one or more correlators to correlate combined modulated radar return signals with each of the modulation waveforms; and
fast-Fourier transform (FFT) circuitry to perform fast-Fourier transforms (FFTs) on correlation output signals from the one or more correlators for use in estimating a trajectory of the target.

22. The radar system of claim 21 wherein the modulation waveforms comprise a plurality of waveforms generated from substantially orthogonal code sequences.

23. The radar system of claim 22 wherein signal processing circuitry further comprises a trajectory calculator to interpolate between correlation output signals associated with different antennas to estimate an azimuth angle and an elevation angle of the target.

24. The radar system of claim 21 wherein the modulation waveforms comprise either pseudo-orthogonal waveforms or quadratic-polyphase waveforms.

25. A method of operating a radar system comprising:
modulating radar return signals received through an associated receive-signal path with one of a plurality of differing modulation waveforms having a low cross-correlation product;
combining the differently modulated return signals from each receive-signal path, each receive-signal path being associated with a different direction; and
performing correlations on the combined and differently modulated radar return signals using the modulation waveforms to determine a location of a target.

26. The method of claim 25 wherein each receive-signal path receives signals from an associated one of a plurality of spatially-separated antennas, the antennas positioned to receive signals from at least slightly different directions, and wherein the method further comprises simultaneously transmitting a radar signal in each of the at least slightly different directions.

27. The method of claim 26 performing correlations comprises correlating the combined modulated radar return signals with each of the modulation waveforms, and
wherein the method further comprises performing fast-Fourier transforms (FFTs) on correlation output signals from the one or more correlations for use in estimating a trajectory of the target.

28. The method of claim 27 wherein the modulation waveforms comprise a plurality of waveforms generated from substantially orthogonal code sequences.

29. The method of claim 28 further comprising interpolating between correlation output signals associated with different antennas to estimate an azimuth angle and an elevation angle of the target.

30. The method of claim 27 wherein the modulation waveforms comprise either pseudo-orthogonal waveforms or quadratic-polyphase waveforms.

31. A passive direction-finding system comprising:
a plurality of modulators, each modulator to modulate signals received from a signal source through an associated receive-signal path with one of a plurality of differing modulation waveforms having a low cross-correlation product;
combining circuitry to combine the modulated signals from each receive-signal path, each receive-signal path being associated with a different direction; and
signal processing circuitry to perform correlations on the combined modulated signals using the modulation waveforms to determine a direction to the signal source.

32. The passive direction-finding system of claim 31 wherein each receive-signal path receives signals from an associated one of a plurality of spatially-separated antennas, the antennas positioned to receive signals from at least slightly different directions.

33. The passive direction-finding system of claim 32 wherein the signal processing circuitry comprises one or more correlators to correlate combined modulated signals with each of the modulation waveforms; and
fast-Fourier transform (FFT) circuitry to perform fast-Fourier transforms (FFTs) on correlation output signals from the one or more correlators for use in estimating the direction to and a frequency of the signal source.

34. The passive direction-finding system of claim 33 wherein the modulation waveforms comprise a plurality of waveforms generated from substantially orthogonal code sequences.

35. The passive direction-finding system of claim 34 wherein the modulation waveforms comprise either pseudo-orthogonal waveforms or quadratic-polyphase waveforms.

36. A method of locating a signal source comprising:
modulating signals received from a signal source through an associated receive-signal path with one of a plurality of differing modulation waveforms having a low cross-correlation product;
combining circuitry to combine the modulated signals from each receive-signal path, each receive-signal path being associated with a different direction; and
performing correlations on the combined modulated signals using the modulation waveforms to determine a direction to the signal source.

37. The method of claim 36 wherein each receive-signal path receives signals from an associated one of a plurality of spatially-separated antennas, the antennas positioned to receive signals from at least slightly different directions.

38. The method of claim 37 wherein performing correlations comprises correlating the combined modulated signals with each of the modulation waveforms, and
   wherein the method further comprises performing fast-Fourier transforms (FFTs) on correlation output signals from the one or more correlators for use in estimating the direction to and a frequency of the signal source.

39. The method of claim 38 wherein the modulation waveforms comprise a plurality of waveforms generated from substantially orthogonal code sequences.

40. The method of the 38 wherein the modulation waveforms comprise either pseudo-orthogonal waveforms or quadratic-polyphase waveforms.

* * * * *